United States Patent
Bang

(10) Patent No.: US 8,803,786 B2
(45) Date of Patent: Aug. 12, 2014

(54) BACKLIGHT UNIT AND LIQUID CRYSTAL DISPLAY USING THE SAME

(75) Inventor: Ju Young Bang, Seoul (KR)

(73) Assignee: LG Display Co., Ltd., Seoul (KR)

( * ) Notice: Subject to any disclaimer, the term of this patent is extended or adjusted under 35 U.S.C. 154(b) by 1174 days.

(21) Appl. No.: 11/448,715

(22) Filed: Jun. 8, 2006

(65) Prior Publication Data

US 2007/0146297 A1    Jun. 28, 2007

(30) Foreign Application Priority Data

Jun. 9, 2005  (KR) .................... 10-2005-0049502

(51) Int. Cl.
| | | |
|---|---|---|
| *G09G 3/36* | (2006.01) | |
| *G02F 1/1333* | (2006.01) | |
| *G02F 1/1335* | (2006.01) | |
| *F21V 1/00* | (2006.01) | |
| *F21V 11/00* | (2006.01) | |
| *F21V 7/04* | (2006.01) | |

(52) U.S. Cl.
USPC ............. 345/102; 349/58; 349/61; 349/62; 362/235; 362/240; 362/612

(58) Field of Classification Search
USPC .................... 345/38–40, 102; 349/62, 64
See application file for complete search history.

(56) References Cited

U.S. PATENT DOCUMENTS

| | | | | |
|---|---|---|---|---|
| 5,453,855 | A  * | 9/1995  | Nakamura et al. | 349/58 |
| 5,490,048 | A  * | 2/1996  | Brassier et al. | 362/238 |
| 6,700,633 | B2 * | 3/2004  | Cho | 349/65 |
| 6,974,229 | B2 * | 12/2005 | West et al. | 362/227 |
| 7,157,850 | B2 * | 1/2007  | Miyazaki et al. | 313/495 |
| 7,204,604 | B2 * | 4/2007  | Chou | 362/227 |
| 8,004,631 | B2 * | 8/2011  | Bang et al. | 349/62 |
| 2002/0097570 | A1* | 7/2002 | Greiner | 362/31 |
| 2003/0025853 | A1  | 2/2003 | Lee et al. | |
| 2003/0147055 | A1* | 8/2003 | Yokoyama | 353/98 |
| 2005/0265045 | A1* | 12/2005 | Moon | 362/560 |
| 2005/0281050 | A1* | 12/2005 | Chou | 362/612 |
| 2006/0120107 | A1* | 6/2006 | Pao et al. | 362/612 |
| 2008/0002097 | A1* | 1/2008 | Moon et al. | 349/64 |

FOREIGN PATENT DOCUMENTS

| | | |
|---|---|---|
| CN | 1558283 A | 12/2004 |
| CN | 1570726 A | 1/2005 |
| JP | 2003-57450 A | 2/2003 |
| JP | 2005-44661 A | 2/2005 |

\* cited by examiner

*Primary Examiner* — Matthew Fry
(74) *Attorney, Agent, or Firm* — Birch, Stewart, Kolasch & Birch, LLP

(57) ABSTRACT

This invention relates to a backlight unit that is adaptive for reducing light loss caused by an intermediate light guide panel and reducing sag of the intermediate light guide panel. A backlight unit may include a bottom cover where a reflection plate is formed, a plurality of light emitting diodes installed inside the bottom cover, a plurality of intermediate light guide panels installed on the light emitting diodes and separated from each other, a diffusion plate for diffusing the light from the intermediate light guide panels and the reflection plate, and a plurality of optical sheets placed on the diffusion plate.

11 Claims, 8 Drawing Sheets

25

25

25c

25

BACKLIGHT UNIT AND LIQUID CRYSTAL DISPLAY USING THE SAME

This application claims the benefit of the Korean Patent Application No. 10-2005-0049502 filed on Jun. 9, 2005 which is hereby incorporated by reference.

BACKGROUND OF THE INVENTION

1. Field of the Invention

The present invention relates to a backlight unit, and more particularly to a backlight unit for reducing light loss caused by an intermediate light guide panel and for reducing sag of the intermediate light guide panel. Further, the present invention relates to a liquid crystal display device for increasing display quality by a use of the backlight unit.

2. Description of the Related Art

Generally, a liquid crystal display device has its application scope on a broadening trend due to characteristics of lightness, thinness, low driving power consumption, etc. Accordingly, the liquid crystal display device is used in office automation equipments, audio/video equipments, etc. The liquid crystal display device controls the transmitted amount of light beam in accordance with a signal applied to a plurality of control switches that are arranged in a matrix pattern, thereby displaying a desired picture on a screen.

The liquid crystal display device is not a self-luminous display device, and requires a separate light source such as a backlight.

The backlight is classified into a direct type and an edge type in accordance with the location of the light source. The edge type backlight has the light source installed at the edge of one side of a liquid crystal display device, and irradiates an incident light from the light source to a liquid crystal display panel through a light guide panel and a plurality of optical sheets. The direct type backlight has a plurality of light sources disposed below the liquid crystal display panel, and irradiates the incident light from the light sources to the liquid crystal display panel through a diffusion plate and a plurality of optical sheets.

The light source used in the backlight is classified into a cold cathode fluorescent lamp CCFL and a light emitting diode (hereinafter, referred to as 'LED'). Recently, the direct type backlight with high color purity is increasingly used on LCD TVs.

Referring to FIG. 1, a liquid crystal display device of the related art includes a liquid crystal display panel 11 for displaying a picture; and a backlight unit 10 for irradiating light to the liquid crystal display panel 11.

The liquid crystal display panel 11 includes a plurality of data lines, a plurality of scan lines crossing the data lines and liquid crystal cells between upper and lower substrates arranged in an active matrix pattern. Further, in the liquid crystal display panel, pixel electrodes and a common electrode are formed for applying electric field to each of the liquid crystal cells. Thin film transistors (hereinafter, referred to as 'TFT') for switching a data voltage applied to the pixel electrode in response to a scan signal are formed in the crossing parts of the data lines and the scan lines. In the liquid crystal display panel, gate drive integrated circuits (hereinafter, referred to as 'IC') are electrically connected to gate drive IC's through a tape carrier package (hereinafter, referred to as 'TCP').

The backlight unit 10 includes a bottom cover 13; a lower reflection plate 14; an intermediate light guide panel 15; a diffusion plate 16; a plurality of light emitting diodes 17 and a plurality of optical sheets 12.

The bottom cover 13 includes a bottom surface and a side surface, and receives the lower reflection plate 14 thereinside. Holes respectively penetrating the light emitting diodes 17 are formed in the lower reflection plate 14.

The light emitting diodes 17 includes a red light emitting diode, a green light emitting diode and a blue light emitting diode, and generates red, green and blue lights by emitting light by the current supplied from a light source drive circuit (not shown).

The intermediate light guide panel 15 is made from a transparent plastic material, and is disposed between the light emitting diodes 17 and the diffusion plate 16. An intermediate reflection plate 18 corresponding to the light emitting diode in one-to-one relationship is stuck to a bottom surface location corresponding to a location right above the light emitting diode 17 on the intermediate light guide panel 15. The intermediate reflection plate 18 is called as a diverter, and reflects the red, green and blue lights which are directly irradiated from the light emitting diodes 17.

The red, green and blue lights irradiated from the light emitting diodes 17 are mixed by the lower reflection plate 14, the intermediate reflection plate 18 and the intermediate light guide panel 15, and as a result, a white light is incident to the optical sheets 12 through the diffusion plate 16.

The diffusion plate 16 is assembled together with the bottom cover 13 with the intermediate light guide panel 15. The diffusion plate 16 includes a plurality of beads and disperses the light incident through the intermediate light guide panel 15 by use of the beads to prevent brightness difference generated between locations of the light emitting diodes and in other locations in the display surface of the liquid crystal display panel 11.

The optical sheets 12 include a diffusion sheet and a prism sheet, and act to increase brightness in the front of the display surface by uniformly irradiating the light incident from the diffusion plate 16 to the whole liquid crystal display panel 11 and bending the progress path of the light in a vertical direction to the display surface.

The backlight unit 10 of the related art has at least a following problem. The intermediate light guide panel 15 has supporting points only on, the edge of the liquid crystal display device However, as the size of the display device increases, a sag of the intermediate light guide panel 15 becomes more pronounced. When the sag occurs, the gaps between the intermediate reflection plates 18 and the light emitting diodes 17 are varied, and as a result, the amount of the light incident to the liquid crystal display panel 11 is reduced which lowers the brightness. Also the red, green and blue lights generated from the light emitting diodes 17 are not uniformly mixed which decreases the color purity of the white light irradiated from the liquid crystal display panel 11. As a result, a color reproduction characteristic of the liquid crystal display panel 11 deteriorates.

SUMMARY OF THE INVENTION

Accordingly, it is an object of the present invention to provide a backlight unit that is adaptive for reducing light loss caused by an intermediate light guide panel and reducing a sag of the intermediate light guide panel.

It is another object of the present invention to provide a liquid crystal display device that is adaptive for increasing display quality by a use of the backlight unit.

In order to achieve these and other objects of the invention, a backlight unit according to an aspect of the present invention includes a bottom cover where a reflection plate is formed; a plurality of light emitting diodes installed inside the bottom cover; a plurality of intermediate light guide panels installed over the light emitting diodes and separated from each other; a diffusion plate for diffusing light from the intermediate light guide panels and the reflection plate; and a plurality of optical sheets placed over the diffusion plate.

The backlight unit further includes a plurality of light guide panel supporting stands installed between the reflection plate and the intermediate light guide panels to support the intermediate light guide panels.

In the backlight unit, any one of a light reflection pattern and a light diffuse reflection pattern is formed on a bottom surface of the intermediate light guide panel facing the light emitting diodes.

In the backlight unit, any one of a light reflection material, a light diffuse reflection material and a light absorption material is formed on a side surface and a corner part of the intermediate light guide panel.

A liquid crystal display device according to another aspect of the present invention includes a backlight unit inclusive of a bottom cover where a reflection plate is formed; a plurality of light emitting diodes installed inside the bottom cover; a plurality of intermediate light guide panels installed on the light emitting diodes and are separated from each other; a diffusion plate for diffusing light from the plurality of intermediate light guide panels and the reflection plate; and a plurality of optical sheets placed over the diffusion plate; and a liquid crystal display panel which displays a picture by modulating the light from the backlight unit in accordance with an electric field applied to a liquid crystal layer.

The liquid crystal display device further includes a plurality of light guide panel supporting stands installed between the reflection plate and the intermediate light guide panels to support the intermediate light guide panels.

In the liquid crystal display device, any one of a light reflection pattern and a light diffuse reflection pattern is formed on a bottom surface of the intermediate light guide panel facing the light emitting diodes.

In the liquid crystal display device, any one of a light reflection material, a light diffuse reflection material and a light absorption material is formed on a side surface and a corner part of-the intermediate light guide panel.

A backlight unit for a display according to a further aspect of the invention includes a bottom cover; a plurality light emitting diodes formed over the bottom cover; a lower reflection plate formed over a lower surface of the bottom cover, wherein a plurality of holes are formed corresponding to the plurality of light emitting diodes to allow the plurality of light emitting diodes to penetrate therethrough; a plurality of intermediate light guide panels formed over the plurality of light emitting diodes; and a plurality of light guide supporting stands formed over the lower reflection plate to support the plurality of intermediate light guide panels.

The backlight unit can further include a diffusion plate formed over the plurality of intermediate light guide panels for diffusing light from the plurality of light emitting diodes transmitted through the plurality of intermediate light guide panels and reflected by the lower reflection plate. A plurality of beads can be formed on the diffusion plate for dispersing the light incident on the diffusion plate.

The plurality of light emitting diodes includes one or more side emitting diodes in which a majority of light generated by the diode is emitted through a side of the diode. For Example, the diodes may have a concave shaped waist.

A plurality of minute patterns and/or a reflection plate are can be formed on a surface an intermediate light guide panel facing the plurality of light emitting-diodes. The minute patterns and/or the reflection -plate can be formed from a total reflection material or a diffuse reflection material. Also, any combination of the total reflection material, the diffuse reflection material, and a light absorbing material can be formed on a side surface the intermediate light guide panel.

The light guide panel or panels can be formed integrally with the light guide supporting stand or stands. The light guide panel can be in a continuous stripe shape or formed as a plurality of columns separated by a designated gap.

The backlight unit can be a part of the liquid crystal display device. The liquid crystal device may further include a diffusion plate over the backlight unit for diffusing light from the backlight unit; a plurality of optical sheets over the diffusion plate for irradiating light from the diffusion plate a liquid crystal display panel; and the liquid crystal display panel over the plurality of optical sheets.

The plurality of optical sheets may include a diffusion sheet and a prism sheet.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENTS

Reference will now be made in detail to the preferred embodiments of the present invention, examples of which are illustrated in the accompanying drawings.

With reference to FIGS. 2 to 6, embodiments of the present invention will be explained as follows.

Figure 1:
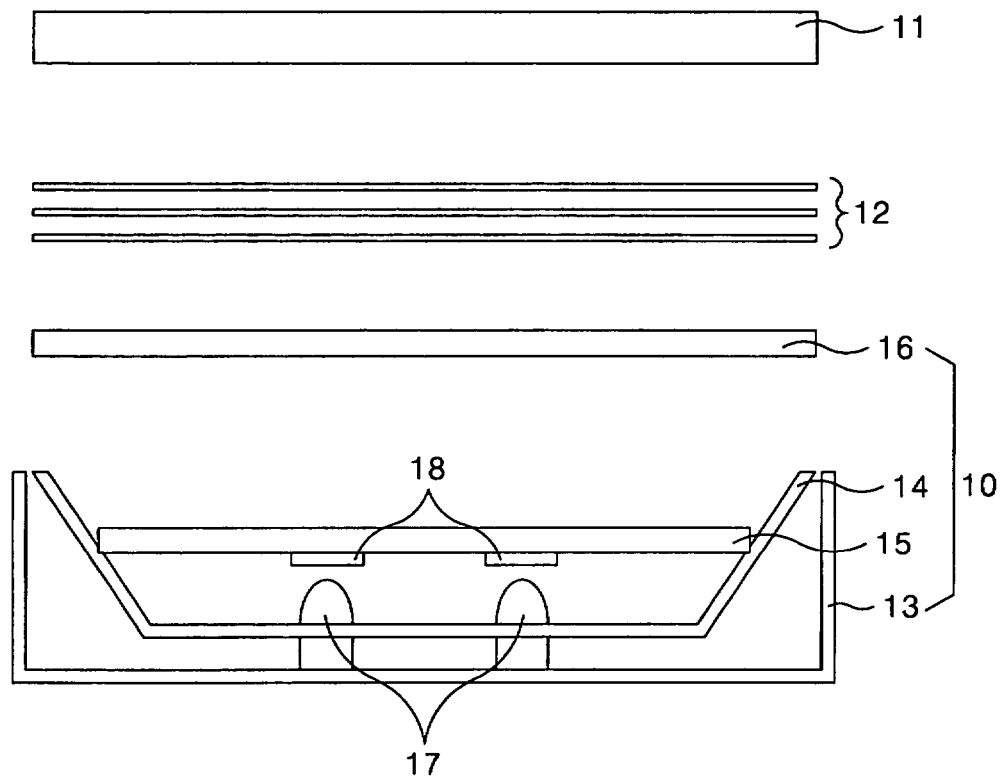
FIG. 1 is a cross sectional diagram representing a liquid crystal display device of the related art.
Figure 2:
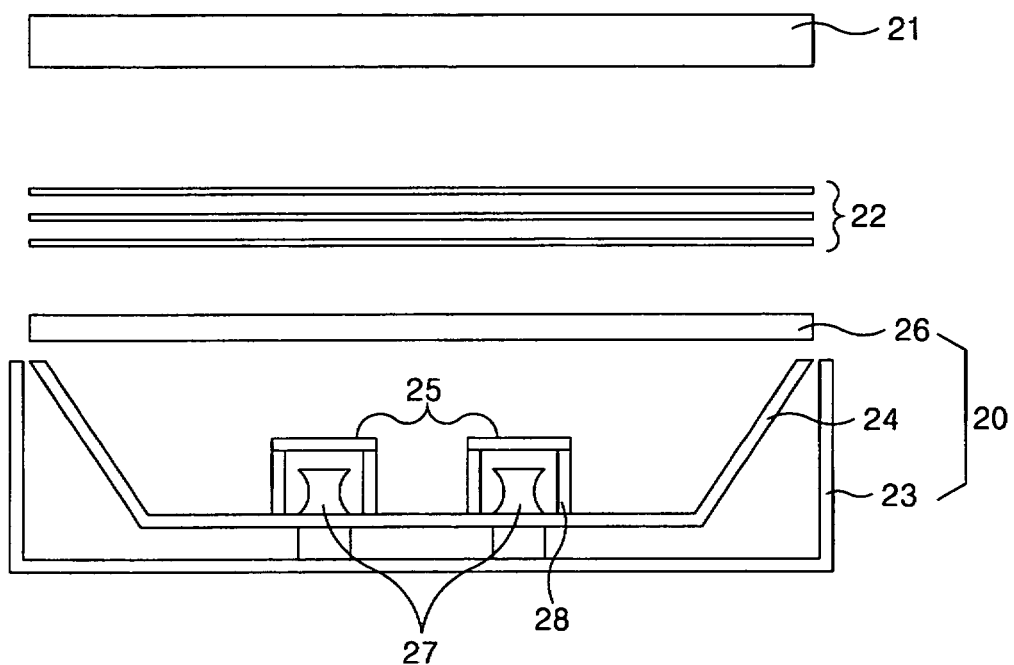
FIG. 2 is a cross sectional diagram representing a liquid crystal display device according to an embodiment of the present invention.

Referring to FIG. 2, a liquid crystal display device according to the embodiment of the present invention includes a liquid crystal display panel 21 for displaying a picture, and a backlight unit 20 where an intermediate light guide panel is divided into a plurality of panels.

In the liquid crystal display panel 21, a plurality of data lines and a plurality of scan lines are arranged to cross each other and liquid crystal cells between upper and lower substrates are arranged in a matrix pattern. Further, pixel electrodes and a common electrode for applying electric field to each of the liquid crystal cells are formed in the liquid crystal display panel 21. TFT's for switching a data voltage applied to the pixel electrode in response to a scan signal are formed in the crossing parts of the data lines and the scan lines. In the liquid crystal display panel 21, scan drive integrated circuits are electrically connected to data driver integrated circuits.

A fabrication process of the liquid crystal display panel 21 is divided into a substrate cleaning process, a substrate patterning process, an alignment film forming/rubbing process, a substrate bonding/liquid crystal injecting process, a mounting process, an inspection process, a repair process, etc. In the substrate cleaning process, impurities contaminating a substrate surface are removed by a cleaning solution.

The substrate patterning process is divided into a patterning of an upper substrate (color filter substrate) of the liquid crystal display panel and a patterning of a lower substrate (TFT array substrate). A color filter, a common electrode, a black matrix, etc are formed on the upper substrate. On the lower substrate, signal wire lines such as data lines and gate lines are formed, a TFT is formed at each of the crossing parts of the data lines and the gate lines, and a pixel electrode is formed in a pixel area between the gate line and the data line connected to a source electrode of the TFT.

In the alignment film forming/rubbing process, an alignment film is spread over each of the upper and lower substrates and the alignment film is rubbed with a rubbing cloth, etc.

In the substrate bonding/liquid crystal injecting process, the upper substrate and the lower substrate are bonded by use of a sealant, and a liquid crystal and spacers are injected through a liquid crystal injection hole, and then the liquid crystal injection hole is sealed off.

In the mounting process of the liquid crystal display panel 21, a TCP mounted with integrated circuits such as the gate drive integrated circuit and the data drive integrated circuit is-connected to a pad part of the substrate. The drive integrated circuit can be directly mounted on the substrate by a chip-on-glass COG method other than a tape automated bonding TAB method using the foregoing TCP.

The inspection process includes an electrical inspection carried out after forming the various signal lines and the pixel electrode on the lower substrate, an electrical inspection and a macrography carried out after the substrate bonding/liquid crystal injecting process.

In the repair process, a restoration is performed for the substrate which is judged to be repairable by the inspection process. A module where a backlight unit, a printed circuit board PCB and a case/sash member are assembled is a liquid crystal display module, as shown in FIG. 2, together with the liquid crystal display panel 31 which is completed by such processes.

The backlight unit 20 includes a bottom cover 23, a lower reflection plate 24, a plurality of intermediate light guide panels 25, a diffusion plate 26, a plurality of light emitting diodes 27, a plurality of optical sheets 22 and a light guide panel supporting stand 28.

The bottom cover 23 includes a bottom surface and a side surface, and receives the lower reflection plate 24 therewithin. Holes respectively penetrating light emitting diodes 27 are formed in the lower reflection plate 24.

The light emitting diodes 27 can be arranged in multiple rows (two in FIG. 2) each inclusive of a red light emitting diode, a green light emitting diode and a blue light emitting diode, and emit light by the current supplied from a light source drive circuit to generate red, green and blue lights. The light emitting diode 27 is selected as a side emitting LED that is sealed with a transparent resin cap of which the waist part is concave so that a majority of light (for example, 80%) generated is radiated in a side direction through the concave waist part and the remaining light is radiated in an upper direction, thereby increasing the degree of mixture of the red, green and blue colors.

Figure 3A:
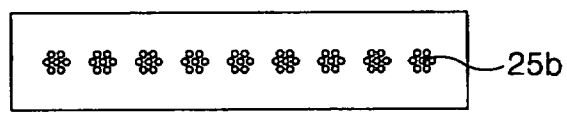
FIGS. 3A to 3C are plan views representing the bottom surface of an intermediate light guide panel shown in FIG. 2.
Figure 3B:
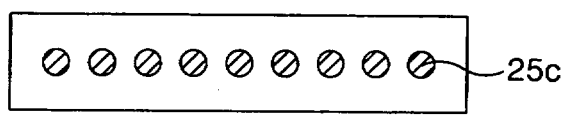
Figure 3C:

The intermediate light guide panels 25 can be divided into multiple rows so as to correspond to the light emitting diode rows in one-to-one relationship, and is made from a transparent plastic material to be disposed between the light emitting diodes 27 and the diffusion plate 26. The intermediate light guide panels 25 can be made from a transparent resin, a plastic material or an optical material such as a diffusion plate, e.g., PMMA (polymethylmethacrylate), polycarbonate, methylmethacrylate styrene copolymer, etc. On the bottom surface corresponding to a location right above the light emitting diode 27 in each of the intermediate light guide panels 25, minute patterns 25b may be formed, as in FIG. 3A, a reflection plate 25c may be formed, as in FIG. 3B, or no pattern is formed, as shown in FIG. 3C. The minute patterns 25b or the reflection plate 25c can be formed on the lower surface of the intermediate light guide panels 25 facing the LEDs and can be formed from a specular reflection (total reflection) material or from a diffuse reflection material.

Figure 4:
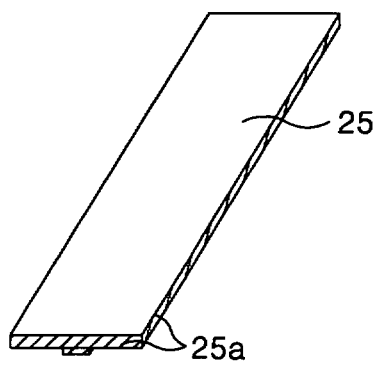
FIG. 4 is a perspective plan view showing a side surface and a corner part of the intermediate light guide panel shown in FIG. 2.

Light might leak out through the divided cross section, i.e., the side surface 25a of the intermediate light guide panels 25 shown in FIG. 4, and corner parts between the side surfaces 25a which may be undesirable. The uniformity of light might be compromised due to such leaks. Thus, a reflection plate or diffusion plate material may be adhered to or coated on the side surfaces 25a including the corners, or a light absorbing material can be adhered thereto or coated thereon.

Figure 5:
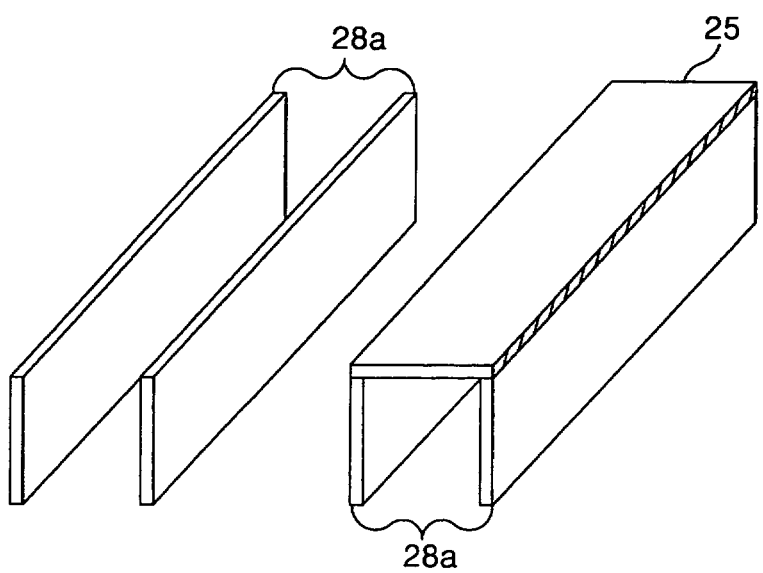
FIGS. 5 and 6 are perspective plan views representing a light guide supporting stand shown in FIG. 2.
Figure 6:
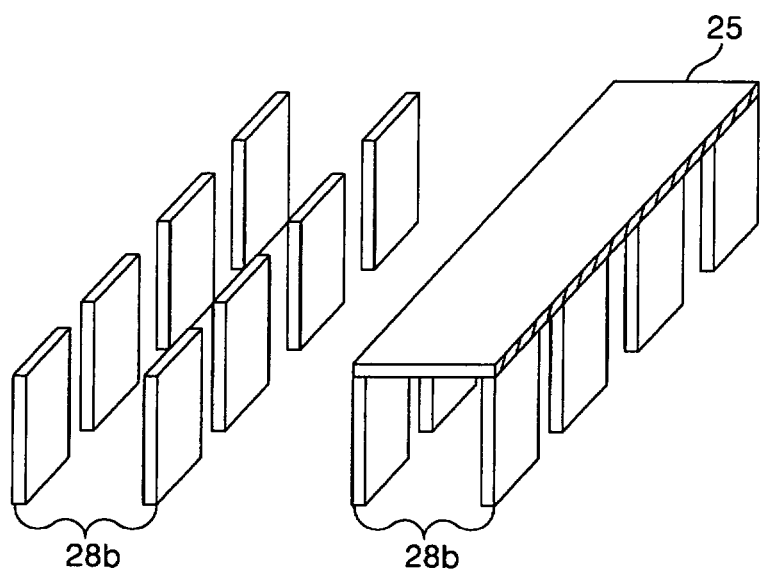

The light guide plate supporting stand 28 is installed between the intermediate light guide panel 25 and the lower reflection plate 24 to support both sides of the intermediate light guide panel 25 thereby preventing the sag of the intermediate light guide panel 25 from occurring. The light guide panel supporting stand 28 can be formed of the same material as the intermediate light guide panel 25 to be integral with the intermediate light guide panel 25, and can be formed separately from the intermediate light guide panel 25. The light guide supporting stand 28 may be made in a continuous stripe shape 28a, as shown in FIG. 5, or can be made in a shape of a plurality of columns 28b which are separated with a designated gap, as shown in FIG. 6.

The diffusion plate 26 is assembled with the bottom cover 23 with the divided intermediate light guide panels 25. The diffusion plate 26 includes a plurality of beads and disperses the light from the divided light guide panels 25 by use of the beads, thereby preventing or minimizing brightness variation generated in the location of the light emitting diodes 27 and the other location in the display surface of the liquid crystal display panel 21.

Optical sheets 22 include a diffusion sheet and a prism sheet, and the optical sheets 22 irradiate the light from the diffusion plate 26 to the whole liquid crystal display panel 21 and bends the progress path of the light in a vertical direction to the display surface, thereby acting to increase the brightness in front of the display surface.

Accordingly, the backlight unit according to the present invention can prevent the sag of the intermediate light guide panel by dividing the intermediate light guide panel and can reduce the light loss generated while being transmitted through the intermediate light guide panels by reducing the area of the un-divided intermediate light guide panel. As a result, the liquid crystal display device according to the present invention can increase picture quality by increasing color purity and brightness by use of the backlight unit.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A backlight unit for a display, comprising:
   a bottom cover;

a plurality of light emitting diodes formed over the bottom cover;

a lower reflection plate formed over a lower surface of the bottom cover, wherein a plurality of holes are formed corresponding to the plurality of light emitting diodes to allow the plurality of light emitting diodes to penetrate therethrough;

a plurality of intermediate light guide panels formed over the plurality of light emitting diodes; and a plurality of first light guide panel supporting stands and a plurality of second light guide panel supporting stands formed over the lower reflection plate to support the plurality of intermediate light guide panels, wherein the plurality of intermediate light guide panels includes lower and upper surfaces through which light emitted from the light emitting diodes is transmitted, and side surfaces and corners including a light absorbing material, wherein the first light guide panel supporting stands and a plurality of second light guide panel supporting stands support both sides of each of the intermediate light guide panel, wherein each of the first light guide panel support stands is comprised as a plurality of first columns separated by a designated gap, wherein each of the second light guide panel supporting stands is comprised as a plurality of second columns separated by a designated gap, wherein an upper portion of the first and second light guide panel supporting stands has a plate-type construction and contact a lower portion of the intermediate light guide panels, wherein the first columns respectively separated by the designated gap are parallel along a first side of each of the intermediate light guide panels, wherein the second columns respectively separated by the designated gap are parallel along a second side of each of the intermediate light guide panels, and wherein the first side of each of the intermediate light guide panels and the second side of each of the intermediate light guide panels are corresponding to each other.

2. The backlight unit according to claim 1, further comprising:

a diffusion plate formed over the plurality of intermediate light guide panels for diffusing light from the plurality of light emitting diodes transmitted through the plurality of intermediate light guide panels and reflected by the lower reflection plate.

3. The backlight unit according to claim 1, wherein the plurality of light emitting diodes includes one or more side emitting diodes in which a majority of light generated by the side emitting diode is emitted through a side of the diode.

4. The backlight unit according to claim 1, wherein the plurality of light emitting diodes includes one or more diodes with a concave shaped waist.

5. The backlight unit according to claim 1, wherein one or both of a plurality of minute patterns and a reflection plate are formed on a surface of at least one intermediate light guide panel facing the plurality of light emitting diodes.

6. A liquid crystal display device, comprising:

the backlight unit according to claim 1; a diffusion plate over the backlight unit for diffusing light from the backlight unit; and a plurality of optical sheets over the diffusion plate for irradiating light from the diffusion plate to a liquid crystal display panel, wherein the liquid crystal display panel is over the plurality of optical sheets.

7. The liquid crystal display device according to claim 6, wherein the plurality of optical sheets include a diffusion sheet and a prism sheet.

8. The backlight unit according to claim 1, wherein at least one light guide panel is formed integrally with at least one light guide supporting stand.

9. The backlight unit according to claim 1, wherein each light guide panel is formed in a continuous stripe shape or as a plurality of columns separated by a designated gap.

10. The backlight unit according to claim 2, wherein a plurality of beads are formed on the diffusion plate for dispersing the light incident on the diffusion plate.

11. The backlight unit according to claim 5, wherein one or both of the minute patterns and the reflection plate are formed from a total reflection material or a diffuse reflection material.

* * * * *